May 10, 1955  F. W. SLACK  2,707,887
HYDRODYNAMIC POWER TRANSMISSION
Filed March 30, 1949  3 Sheets-Sheet 3
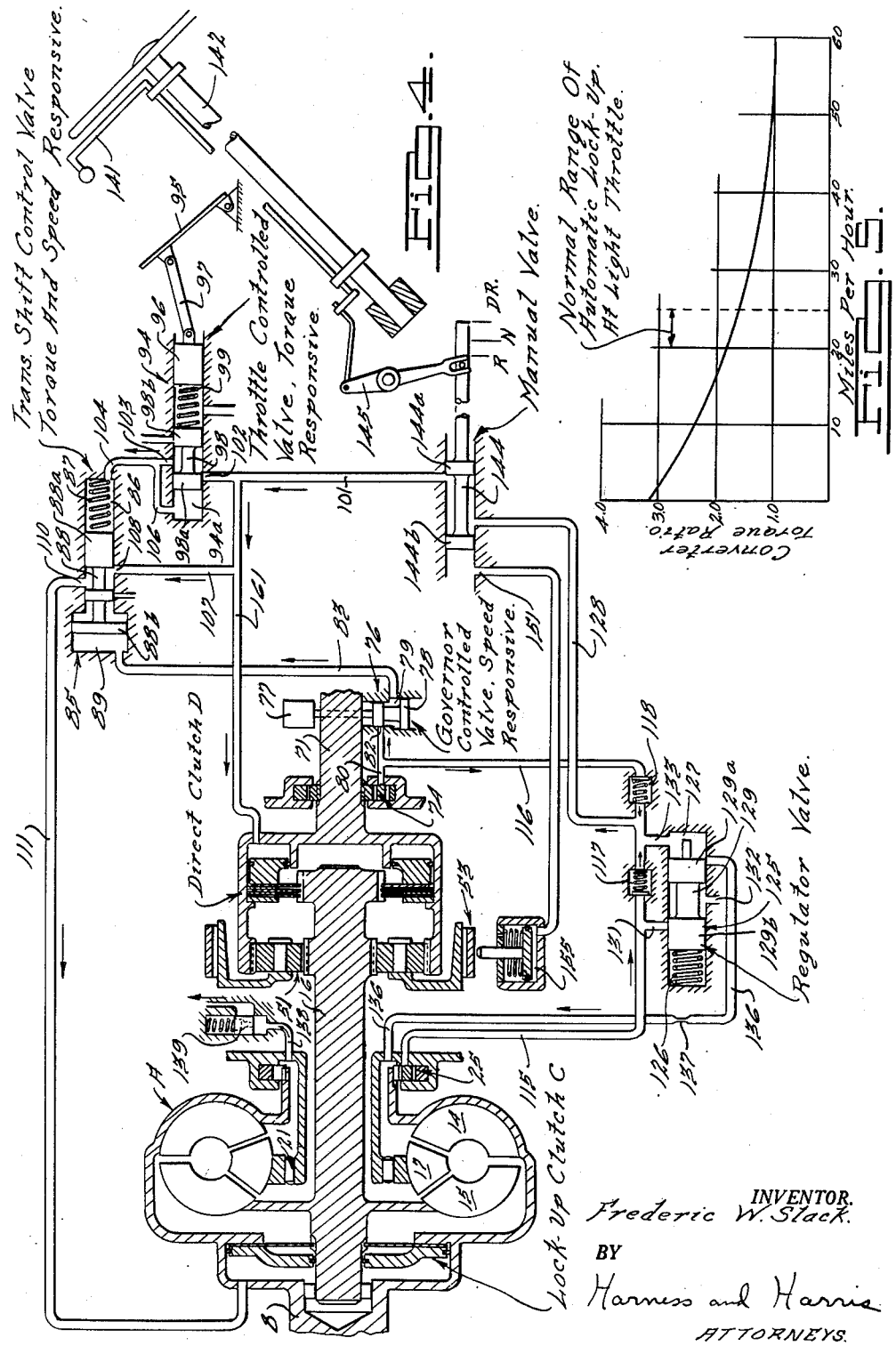
INVENTOR.
Frederic W. Slack.
BY
Harness and Harris
ATTORNEYS.

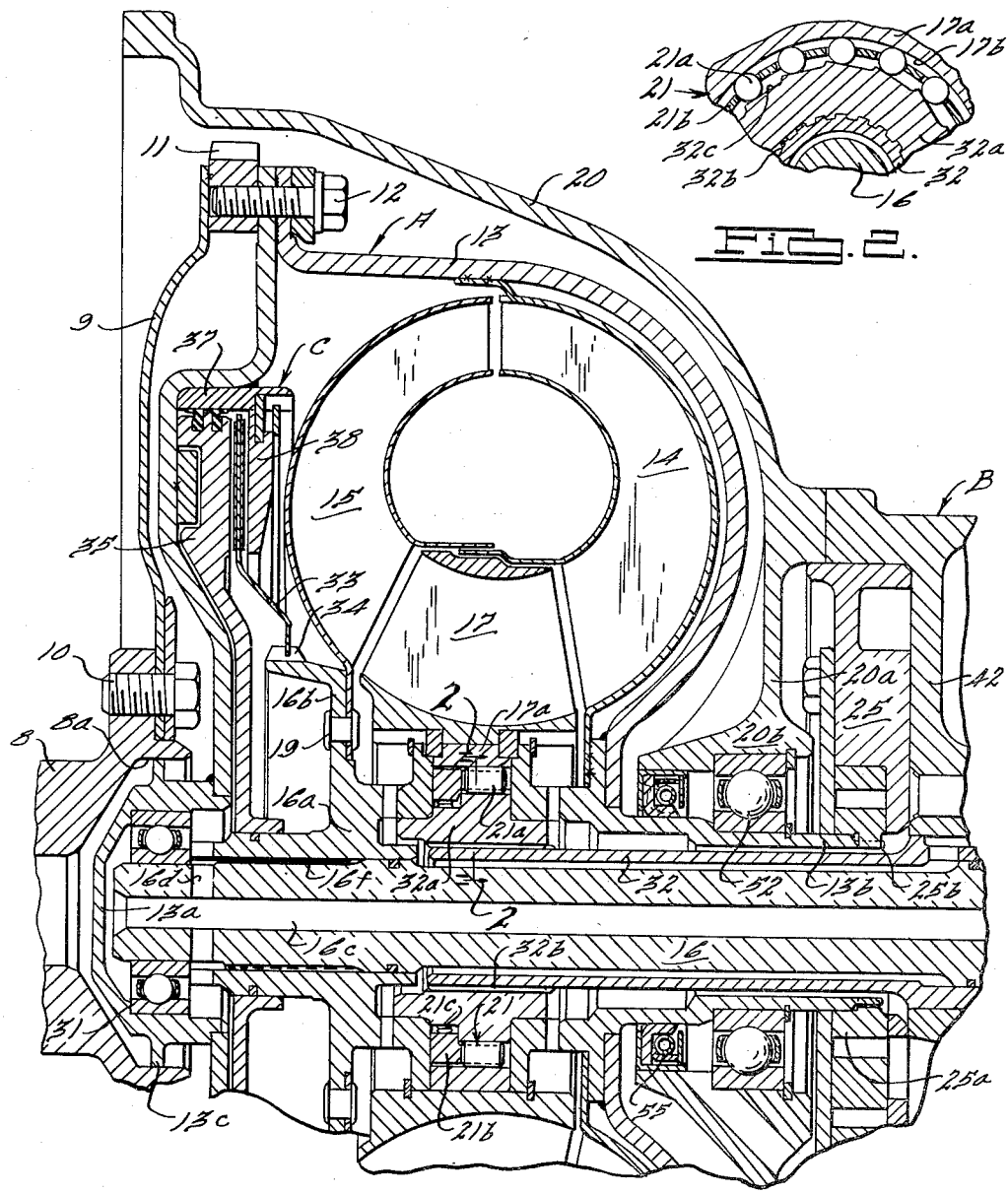

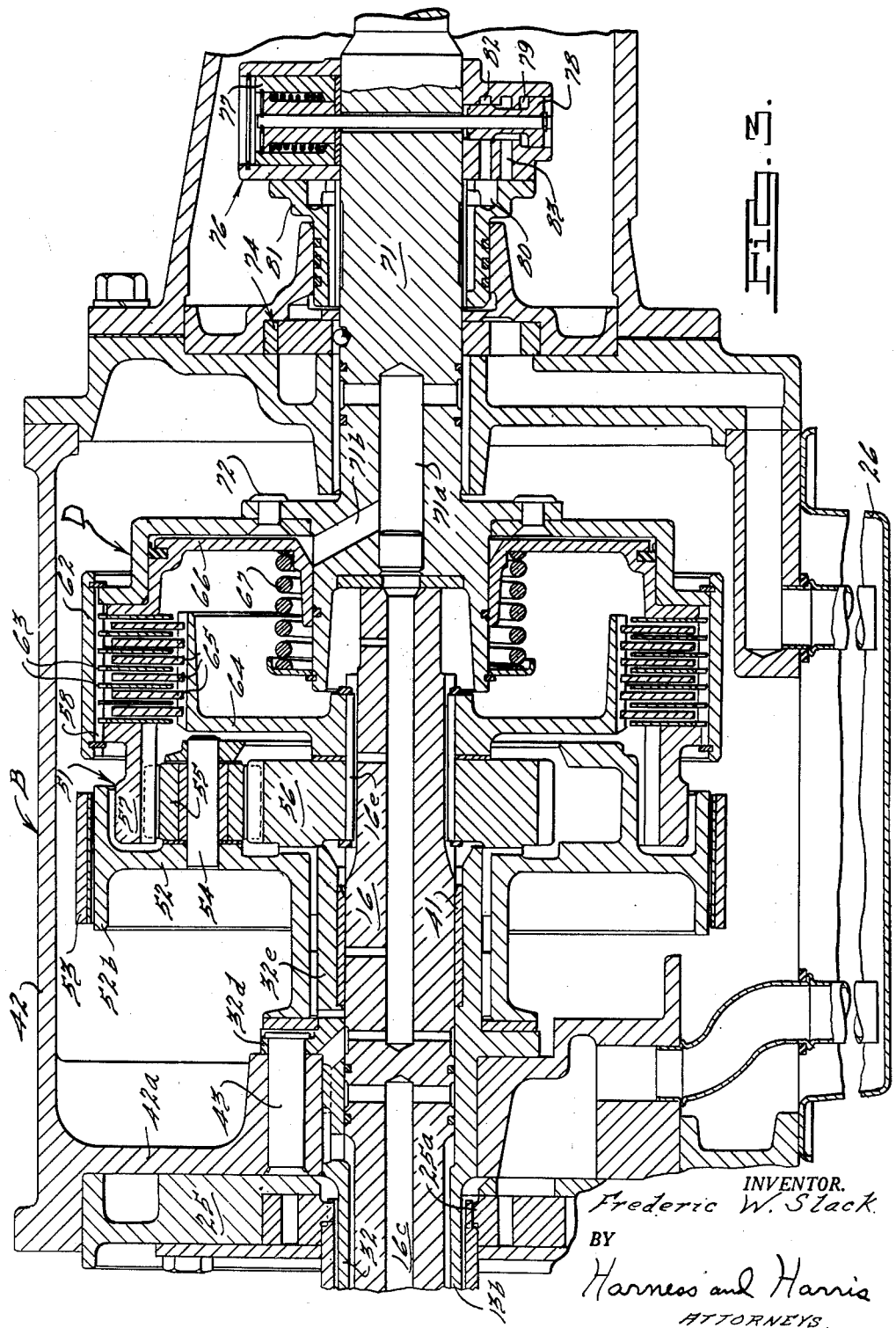

United States Patent Office
2,707,887
Patented May 10, 1955

2,707,887

HYDRODYNAMIC POWER TRANSMISSION

Frederic W. Slack, Detroit, Mich., assignor to Chrysler Corporation, Highland Park, Mich., a corporation of Delaware Application March 30, 1949, Serial No. 84,435

3 Claims. (Cl. 74—645)

This invention relates to a hydrokinetic power transmitting unit particularly adapted for use in motor vehicle drive.

It is a primary object of this invention to provide a transmission unit comprising a torque converter unit having a relatively high torque multiplying ratio in combination with a reverse and direct drive gear unit wherein only the higher torque multiplying ratios of the converter unit are used for starting acceleration in the lower speed ranges after which an automatically actuated lock-up of the torque converter unit provides a positively connected, cruising, forward, direct drive that may be manually kicked down to a high speed accelerating ratio utilizing only the lower torque multiplying ratios of the converter unit. This transmission arrangement also includes means whereby the direct drive may be automatically downshifted to the starting low speed accelerating ratio at the most advantageous point.

It is a further object of this invention to provide an efficient, simplified, power transmission unit that is completely automatic for normal forward drive yet one that includes a manually controlled accelerating ratio for emergency use.

It is an additional object of this invention to provide a transmission unit comprising a hydrokinetic torque converter in combination with a simplified form of gear unit wherein the torque converter is normally used only in its higher torque multiplying ratios where its advantages are most significant and thereafter the torque converter unit is by-passed and a positive, two-way, forward drive provided for the cruising speed range, the lower torque multiplying ratios of the torque converter being reserved for use as a driver controlled accelerating ratio for emergency, high speed use.

It is another object of this invention to associate a hydrokinetic torque converter with a direct and reverse drive gear unit in such a manner that substantially a one-step upshift from starting to direct drive is automatically effected and a two-step downshift from direct to the starting drive ratio is obtainable by the driver overruling the automatically operated downshift controls.

It is a further object of this invention to provide an efficient, flexible, simplified form of power transmission unit having a hydraulically operated control system that is characterized by smoothness of speed ratio changes and the absence of overlap or jerkiness in operation.

It is another object of this invention to provide a flexible simplified form of transmission unit wherein the step-by-step operation of a hydraulic torque converter unit eliminates the need for mechanical gearing in all forward drive through the transmission unit.

Other objects and advantages of this invention will become apparent from the attached specification and the relating drawings wherein:

Fig. 1 is a partial sectional elevation of the hydrokinetic torque converter unit employed with this transmission unit;

Fig. 2 is a fragmentary sectional elevation taken along the line 2—2 of Fig. 1;

Fig. 3 is a sectional elevational view of the planetary gear box and associated mechanism employed to transmit drive from the torque converter unit to the driven shaft;

Fig. 4 is a schematic diagram of the control system for this transmission unit; and Fig. 5 is a graph for the torque converter unit of this transmission wherein torque multiplying ratio is plotted against the speed of the vehicle driven by the transmission unit.

Fig. 1 of the drawings discloses the hydrokinetic torque converter unit A employed with this transmission unit. Converter unit A is adapted to drivingly connect a prime mover such as a motor vehicle engine to a driven member such as the transmission input shaft of a gear type transmission unit. The reference numeral 8 represents an end portion of a driving member, such as the engine crankshaft of a motor vehicle power unit. The shaft 8 is drivingly connected to the axially flexible drive transmitting plate 9 by the screw means 10. The drive transmitting plate 9 has an engine starter ring gear 11 mounted on its periphery by the bolt and nut means 12. Also drivingly connected to the drive plate 9 by the bolt and nut means 12 is the torque converter casing 13 within which are mounted the various converter components, namely, the impeller member 14, the turbine or runner member 15, and the guide wheel or reaction member 17.

The vaned impeller wheel 14 is fixedly connected to the converter casing 13 and is accordingly adapted to be rotatably driven by the driving shaft 8. The vaned turbine wheel 15 is drivingly connected by rivet means 19 to a radially extending flange portion 16b formed on the hub member 16a that is connected by splines 16f to the forward end portion of the intermediate shaft member 16.

The intermediate shaft member 16 is adapted to transmit drive from the torque converter unit A to the planetary gear unit B arranged in series with the torque converter unit A. The forward end of intermediate shaft 16 is piloted in the axially extending annular seat 13a formed in the converter casing 13. A ball bearing assembly 31 rotatably supports the forward end of intermediate shaft 16 in the converter housing seat 13a. The rear end portion of intermediate shaft 16 is rotatably supported by a sleeve-type of bearing 41 mounted in the housing 42 of gear unit B in a manner hereinafter more fully described.

The vaned guide wheel 17 is rotatably supported within the converter casing 13 by means of the guide wheel hub portion 17a that is rotatably mounted, by means of a one-way brake device 21, on an axially extending sleeve 32 that is fixed to and projects from the rearwardly positioned, relatively stationary, gear box housing 42. Sleeve 32 has a hub member 32a splined thereto at 32b which hub member supports the overrunning or one-way brake device 21. As clearly shown in Fig. 2, the one-way brake device 21 comprises rollers 21a mounted within a cage member 21b. The cage member 21b is normally urged into drive transmitting position by means of a tension spring 21c (see Fig. 1). Cam surfaces 32c, formed on the outer peripheral surface of the sleeve hub member 32a, cooperate with the clutch rollers 21a and the outer roller race formed by the bore 17b through the guide wheel hub member 17a to provide an overrunning or one-way brake device. It is thought to be obvious from Fig. 2 that the one-way brake 21 will permit only forward rotary movement (clockwise when looking in the direction of arrows 2—2 of Fig. 1) to be transmitted to guide wheel 17 by the forward rotation of the impeller 14, the brake 21 preventing rotation of the guide wheel 17 in a reverse or counterclockwise direction.

The torque converter unit A includes a gear type oil pump 25 having a driving gear 25a that is directly connected by pin means 25b to the axially extending flange portion 13b of the rotatable converter casing 13. The pump 25 draws oil from a sump 26 (see Fig. 3) and circulates it through the converter unit A, the transmission lubricating system and the various hydraulically operated control mechanisms associated with this transmission unit (see Fig. 4). The circulation of oil through the converter A, by the pump 25, provides a means for maintaining the converter full of oil whenever shaft 8 is rotating. Furthermore, this circulation of the working fluid through the converter and the lubricating and hydraulically operated control systems provides a means for cooling the converter fluid. A second pump, driven by the transmission output shaft is also included in this transmission to provide a source of pressure fluid when the engine is not operating. This pump will be more fully described in connection with the planetary gear box B.

The relatively stationary outer housing 20 for the converter unit A has a rear wall portion 20a from which there projects a forwardly directed, axially extending, sleeve-like, flange portion 20b. Fixedly mounted in the housing flange 20b by means of a snap ring is a ball bearing assembly 52. The snap ring holds the outer race of bearing assembly 52 against a shoulder formed in the housing flange 20b and prevents either forward or rearward axial shift of the bearing assembly 52. Bearing assembly 52 rotatably supports the axially extending flange portion 13b of the torque converter casing 13. Casing flange 13b is formed with a shoulder portion which seats against the forward edge of the inner race of bearing assembly 52. A snap ring locks the inner race of bearing assembly 52 against the shoulder of the axially extending flange 13b of the converter casing 13. This particular arrangement for anchoring bearing assembly 52 to the associated portions of the housing flange 20b and the casing flange 13b fixedly anchors the casing flange 13b against either forward or rearward axial movement. A suitable fluid seal 55 is mounted between the housing flange 20b and the converter casing flange 13b.

The forward portion of converter casing 13 includes the axially extending, cup-like casing seat 13a for the bearing assembly 31 in which is rotatably mounted the forward portion of the intermediate shaft 16 as previously mentioned. Due to the anchoring of converter casing flange 13b to the housing flange 20b by the bearing assembly 52, provision is made for permitting the casing seat portion 13a to expand and contract axially so as to absorb the inherent breathing tendencies of the flexible converter casing 13. Casing seat 13a is piloted within an axially extending bore 8a in the driving shaft member 8. A bearing means, such as the radially extending annular rib 13c, is provided in the converter casing seat 13a and extends between the seat 13a and the inner wall of the bore 8a in driving shaft 8. This rib-like bearing formation 13c provides a sliding telescopic connection between the casing 13 and driving member 8 to accommodate the breathing tendencies of the converter casing 13. The bearing rib 13c not only provides a sliding connection between the converter casing 13 and the driving member 8 but in addition it acts as a centering means to prevent twisting or cocking of the converter unit A about its axis of rotation. This axially shiftable mounting means for the torque converter casing 13 is completely described in the co-pending application of Augustin J. Syrovy, Serial No. 77,939, filed February 23, 1949, now U. S. Patent 2,588,668, dated March 11, 1952, and forms no part of this invention.

In order to provide means for transmitting a positive, two-way, direct drive from the driving shaft 8 to the intermediate shaft 16 a torque converter lock-up clutch C is provided. The lock-up clutch C includes the radially extending, friction surfaced disc member 33, which member is drivingly connected to the intermediate shaft hub portion 16a by the splined connection 34. Cooperatively associated with the disc 33 is a hydraulically operated clutch piston 35 which is slidably mounted on the intermediate shaft hub portion 16a for axial shift relative thereto. The clutch C includes a ring-like cylinder 37 fixedly mounted on the converter casing 13 so as to provide a bore for piston 35. The piston member 35 is reciprocatably mounted within cylinder 37. Cylinder 37 also supports a backing plate 38 adapted to cooperate with piston 35 to clampingly engage the disc member 33 when piston 35 is moved rearwardly as a result of the admission of pressure fluid to the piston cylinder. Pressure fluid is supplied to the piston cylinder through the bores 16c and 16d in intermediate shaft 16. Spring means (not shown) and the pressure of the fluid within the casing 13 normally urge the piston 35 forwardly to a disengaged clutch position. It will be noted that when the clutch piston 35 has been moved rearwardly to engage the disc member 33 with the backing plate 38 then the torque converter impeller member 14 and the turbine member 15 are locked together and a positive direct drive is transmitted from the driving shaft 8 to the intermediate shaft 16. This direct drive by-passes the torque converter unit A and provides a highly efficient, non-slipping drive that can be used for efficient forward cruising drive and for engine braking during coast drive. The lock-up clutch C is arranged to be engaged after the torque multiplying effect of the converter has dropped from its relatively high starting drive torque multiplication ratio but before the converter unit begins to function as a fluid coupling. By such an arrangement the torque multiplying effects of the converter unit are most advantageously used. With the particular arrangement herein disclosed the torque converter A is designed to have a starting drive torque ratio of approximately 3 to 1 and the lock-up clutch C is arranged to be automatically engaged when the torque multiplying ratio has been reduced to approximately 2 to 1. The reasons for the lock-up of the torque converter A by clutch C prior to the time the converter unit would begin to function as a simple fluid coupling are more fully explained in the subsequent description of the operation of this transmission unit.

The gear box B includes the planetary reverse gearing 51 and the planetary unit forward direct drive clutch mechanism D. The gear box housing 42 includes a forward wall portion 42a to which is connected by pin means 43 a radially extending flange 32d of the axially extending hollow sleeve member 32. The rear portion 32e of sleeve 32 provides a journal support for the sleeve bearing 41. Sleeve portion 32e also rotatably supports the hub portion of the reverse gear planet pinion carrier 52. Pinion carrier 52 has a peripheral flange portion 52b adapted to be releasably engaged by a braking band 53. Pinion carrier 52 has pinion pins 54 to rotatably support a plurality of planet pinion gears 55, only one of which is shown in Fig. 3. Splined to the rearwardly extending end of intermediate shaft 16, as indicated at 16e, is the sun gear 56 of the reverse gearing 51. Sun gear 56 is arranged to meshingly engage the planet pinion gears 55 so as to effect rotation thereof. Also meshingly engaging the planet pinion gears 55 is the annulus gear 57. Annulus gear 57 is drivingly connected by splines or the like 58 to the drum member 62 of the clutch D.

Direct drive clutch D includes the drum member 62, the annular spider member 64 and the axially shiftable piston member 66. Drum member 62 has drivingly mounted thereon the friction discs 63 which are adapted to be releasably engaged with the friction discs 65 drivingly mounted on the spider member 64. Spider member 64 is drivingly connected to the rear end portion of intermediate shaft 16 by splines or the like as indicated at 16e. The shiftable piston 66 is adapted to be moved forwardly to effect engagement of direct drive clutch D by admitting pressure fluid to the cylinder formed by the drum member 62. Pressure fluid is admitted to the cylinder for piston 66 through the shaft bores 71a and 71b in the normally driven or output shaft 71. Spring 67 normally urges the piston member 66 rearwardly to a disengaged clutch position. Drum member 62 of direct drive clutch D is drivingly connected to a radially extending flange on driven shaft 71 by the rivet means 72. It is thought to be obvious that when direct drive clutch D is engaged and the band 53 of the planetary reversing gear mechanism 51 released, then drive will be transmitted directly from intermediate shaft 16 to output or driven shaft 71 through the clutch members 64, 65, 63, 62. At the times when torque converter lock-up clutch C and direct drive clutch D are both engaged then a positive, two-way, direct drive is transmitted from driving shaft 8 to driven shaft 71 by a power transmitting train that by-passes the torque converter unit A. Such a drive is highly efficient for cruising drive for it eliminates the slip that is inherent in a torque converter unit and it also provides a positively connected power transmitting train that will provide engine braking for coast drive. Clutch D is engaged before forward drive is transmitted to the driven shaft 71 by the transmission unit and clutch D remains engaged during all forward drive.

Drivingly connected to the output shaft 71 is a second gear type oil pump 74. Oil pump 74 is arranged to draw fluid from the oil sump 26 and circulate it through the hydraulically operated control and lubrication systems of the transmission unit whenever the output shaft 71 is rotating. Consequently, pump 74 provides pressure fluid for operation of the transmission unit during a pushed or towed start even if engine driven pump 25 is inoperative due to a dead engine. Suitable controls, such as the arrangement shown in Fig. 4, may be provided to have pump 74 automatically take over the supply of pressure fluid for the transmission unit whenever the speed of output shaft 71 exceeds a certain value thereby relieving the pump 25 of its function after the engine unit (not shown) has begun to drive the transmission output shaft 71.

Also drivingly mounted on the output shaft 71 is a speed responsive, centrifugal force operated governor mechanism 76 which provides one of the means for automatically controlling operation of the torque converter lock-up clutch C. The specific structure of this governor mechanism 76 is covered by the application of W. L. Sheppard, Serial No. 98,493, filed June 11, 1949. It is obvious that various types of speed responsive controls may be used with this transmission but the specific governor mechanism 76 herein disclosed is particularly advantageous due to the fact that it does not require gearing or electrically operated units but instead uses pressure fluid, supplied by the rear pump 74, in combination with the centrifugal force actuated, radially movable, weight member 77 to control operation of the governor piston valve 78. Pressure fluid from rear pump 74 is admitted to the governor valve cylinder 79 through the bores 80 in governor housing 81. As the weight 77 moves radially outward from shaft 71, under the influence of centrifugal force, then piston valve 78 uncovers the pressure fluid inlet port 82 and pressure fluid from pump 74 is admitted to the valve cylinder 79 and to the outlet passageway 83 which communicates with the shift valve control mechanism 85 (see Fig. 4). Control 85 is also acted on by a form of accelerator operated control means 94, in addition to the speed responsive governor control 76, so as to provide a so-called accelerator and speed responsive control mechanism for the torque converter lock-up clutch C.

The accelerator operated control means 94 (see Fig. 4), that is operably connected with the speed ratio shift control mechanism 85, is associated with the conventional accelerator pedal 95 of the throttle control means for the transmission driving engine unit (not shown). Pedal 95 is connected to a plunger 96 by linkage 97. Plunger 96 is connected to the piston valve 98 by a compression spring 99. At closed throttle position of the accelerator pedal 95 the land 98a of valve 98 is positioned so as to close inlet 102 and prevent the pressure fluid in supply conduit 101 from passing through the valve unit 94 and entering the conduit 104 that communicates with the chamber 86 in one end of the control valve mechanism 85. As the accelerator pedal 95 is depressed from closed throttle position the plunger 96 is moved to the left and this movement is transmitted by spring 99 to piston valve 98 which valve is moved to the left to uncover the valve cylinder inlet port 102 and admit pressure fluid to cylinder of valve unit 94. At this time the outlet port 103 from the cylinder of valve 94 is uncovered and pressure fluid is admitted to the conduit 104 and to chamber 86 of the shift control valve mechanism 85. With the admission of pressure fluid to conduit 103, on moving valve 98 to the left, pressure fluid is also admitted to the chamber 94a of control valve unit 94 and the pressure fluid in chamber 94a then tends to balance a portion of the pressure being exerted on piston valve 98 through spring 99. This chamber 94a provides a pressure regulated control for governing the volume of pressure fluid introduced into conduit 104. The admission of pressure fluid into valve chamber 86 of control unit 85, upon initial depression of accelerator pedal 95, applies hydraulic pressure to assist the spring 87 in holding piston valve 88 at the left side of the shift control mechanism 85. At this time the valve land 88a of piston valve 88 covers pressure fluid inlet port 108 and prevents pressure fluid from supply conduit 107 from passing through control valve unit 85 and entering conduit 111 to cause engagement of the torque converter lock-up clutch C. Accordingly, for all starting drive the torque converter unit A is available to provide a high torque multiplication drive for accelerating purposes. As previously mentioned this converter unit A is designed for a starting torque multiplication ratio of about 3 to 1. As the vehicle speed and the speed of output shaft 71 increase the speed responsive governor mechanism 76 is automatically activated and at a predetermined speed value the governor piston valve 78 admits pressure fluid from supply conduit 80 to supply conduit 83 which communicates with the chamber 89 at the left end of the shift control valve unit 85. On admission of pressure fluid to the chamber 89 of control mechanism 85 a hydraulic pressure is applied to piston valve land 88b, which opposes the pressure applied to piston valve land 88a by the spring 87 and by the accelerator controlled pressure fluid in valve chamber 86. Admission of pressure fluid to chamber 89 causes the valve 88 to be moved towards the right to the position shown in Fig. 4. Movement of the valve 88 to the right uncovers valve ports 108 and 110 and permits pressure fluid to be directed from conduit 107 through shift control valve mechanism 85 to conduit 111 and into the torque converter lock-up clutch C to effect engagement of the torque converter clutch C. The torque converter and the control system therefore are so designed that this lock-up of the converter unit usually occurs when the torque multiplication ratio has dropped to a ratio of approximately 2 to 1 but always before the converter unit has begun to function substantially as a simple fluid coupling transmitting torque at approximately a 1 to 1 ratio. Several reasons for effecting a lock-up of the torque converter unit A while it is still operating with a relatively large torque multiplication ratio are of importance in this transmission unit. First, by such an arrangement a torque multiplying kick-down ratio for high speed acceleration is available without requiring the use of supplementary gear trains, change speed synchronizing means, or the like. Second, the torque converter unit is used as a torque multiplication means during its most useful and advantageous range and is locked-up for the transmission of an efficient, positive, two-way direct drive during the major portion of the vehicle cruising speed range. This arrangement gives the desired accelerating characteristics on starting drive as well as a two-way, efficient, direct drive for cruising and also a relatively low torque multiplying ratio for high speed acceleration that is obtainable by a kickdown from direct drive.

The control system shown in Fig. 4 also includes the conduits 115 and 116 which connect the pumps 25 and 74 respectively with a pressure regulator valve 125. Spring 126 of pressure regulator valve 125 determines the pressure that is to be maintained in the pressure fluid supply conduit 128. A pressure of approximately 90 pounds per square inch has been found to be satisfactory for operation of this transmission control system. The pump output conduits 115 and 116 each include check valves 117 and 118 to insure a suitable pressure head in the control system at all times. With the control arrangement shown, the pump 25 supplies the fluid pressure for starting drive under ordinary conditions and as the speed of output shaft 71 increases the pump 74 automatically takes over and feeds the supply conduit 128. As pump 74 comes into operation the pressure fluid supplied therefrom is transmitted to chamber 127 of pressure regulator valve 125 and this pressure acts on land 129a of piston valve 129 and moves piston valve 129 towards the left compressing spring 126. Movement of piston valve 129 to the left displaces the valve land 129b so as to connect conduit 131 to drain 132 thereby providing a by-pass for the output of the pump 25. Upon the operation of either pump 25 or 74 the fluid pressure in conduit 133 is always sufficient to move plunger valve 129 slightly to the left to connect conduit 133 with conduit 136 which supplies pressure fluid to the torque converter unit A. This arrangement maintains the converter unit A full of fluid during all operation thereof. Restriction 137 in conduit 136 controls the volume of the fluid supplied to the converter A. The fluid directed through the converter A is returned to the supply sump 26 through the conduit 138 that is connected to the lubrication system and suitable pressure fluid cooling means if such means are deemed necessary for the fluid pressure control system herein disclosed. Conduit 138 includes the pressure relief valve 139 for controlling the pressure of the fluid supplied to the converter unit A. This valve 139 maintains a pressure of about 40 pounds per square inch in the converter unit.

The manual controls for this transmission unit include the drive selector lever 141 which is usually rotatably mounted on the conventional vehicle steering mechanism 142. Control lever 141 is connected to manually operated piston type control valve 144 by the linkage arrangement 145. Drive selector lever 141 has three positions, a centrally located Neutral position, between the terminally located forward Drive position and the Reverse drive position. The three positions are denoted by the letters N, DR and R respectively in Fig. 4.

*Operation*

When drive selector lever 141 is in the Neutral position then manual control valve 144 is positioned so that supply conduit 128 can not direct pressure fluid into either conduit 101 or the reverse gear control conduit 151. Accordingly, neither direct clutch D nor reverse band 53 are in engaged condition and consequently neither a forward nor reverse drive is transmitted to the output shaft 71. The pump 25 at this time will merely circulate fluid through the converter A and the lubrication system. The torque converter lock-up clutch C will remain disengaged regardless of engine or vehicle speed when the drive selector lever is in Neutral.

If the drive selector lever 141 is moved to the forward Drive position (as shown in Fig. 4) then pressure fluid from supply conduit 128 passes through the manually operated control valve assembly 144 into conduit 101 from which the pressure fluid will be directed into the conduit 161 so as to engage direct drive clutch D and condition gear box B for the transmission of a forward direct drive. Prior to depressing of the accelerator pedal 95, when lever 141 is in forward Drive position, the piston valves 88 and 98 of the control valve mechanisms 85 and 94 respectively will be so positioned in their respective valve cylinders that pressure fluid can not be introduced into either of these control valve mechanisms nor into conduit 111 to engage the torque converter clutch C. Furthermore, the engine speed at closed throttle in forward Drive position will be such that slip in the torque converter unit A and drag of the associated drive train elements will prevent actual drive being transmitted to the driven shaft 71 even though the direct drive clutch D is engaged. Subsequently, as the accelerator pedal 95 is depressed to increase the speed of the driving engine unit (not shown) and to initiate forward movement of the vehicle the piston valve 98 will be moved towards the left and pressure fluid from conduit 101 will be admitted to conduit 104 and to the chambers 86 and 94a of the control valve mechanisms 85 and 94 respectively. During initial depression of the accelerator pedal 95 the pressure controlled thereby on the land 88a at the right end of plunger valve 88 is greater than the speed responsive pressure on the land 88b at the left end of plunger valve 88 therefore the valve 88 will be positioned so that land 88a blocks the inlet port 108 at the valve end of conduit 107 and consequently pressure fluid can not be introduced into conduit 111 to effect engagement of torque converter lock-up clutch C. Accordingly, during initial forward acceleration the relatively high torque multiplication ratio of the converter unit A is effective and a torque multiplying accelerating drive of between 3 or 2 to 1 is transmitted by the converter unit A to the output shaft 71. This drive is from driving shaft 8 to turbine driven shaft 16 and through engaged direct drive clutch D to output shaft 71.

Subsequently as the speed of output shaft 71 increases and the torque requirement decreases the speed responsive governor 76 will operate to effect engagement of the torque converter lock-up clutch C and convert the accelerating, relatively high torque multiplying, starting drive into a two-way, positive, direct drive. At a predetermined speed of output shaft 71 governor 76 will cause pressure fluid from conduit 80 to be introduced into conduit 83 through valve 78 and this will apply pressure fluid to the chamber 89 at the left end of control valve mechanism 85. The speed responsive pressure fluid in chamber 89 acts on valve land 88b, which has a larger area than land 88a, and tends to move valve 88 to the right to connect the pressure fluid supply ports 108 and 110 so that line pressure fluid from supply conduit 107 can be introduced into conduit 111 and into torque converter lock-up clutch C. The shift control valve mechanism 85 for effecting engagement and disengagement of the torque converter lock-up clutch C is thus both speed and accelerator responsive, for operation of the accelerator pedal 95 controls the pressure or force applied to the land 88a of control valve 88 which force must be overcome by the speed responsive, governor controlled pressure or force applied to land 88b of the valve 88 in order to cause a shift of the valve 88 to the right to effect engagement of clutch C. As the operation of control valve 88 by speed responsive governor 76 is modified by the throttle controlled valve unit 94, it is obvious that the operation of the torque converter lock-up clutch C is directly related to both the vehicle speed and the accelerator operation. The engagement and disengagement of lock-up clutch C will take place automatically and this will usually occur when the vehicle speed is approximately 18–25 miles per hour at light throttle and up to about 40 miles per hour at open throttle. The torque multiplication ratio is approximately 2 to 1 when converter lock-up occurs at light throttle and may be down to 1.2 to 1 before converter lock-up occurs with wide open throttle (see Fig. 5).

If, while traveling in the two-way, locked-up, direct drive, a high speed accelerating drive is desired then a kickdown to a more favorable accelerating ratio may be driver effected by merely depressing the accelerator pedal 95 an abnormal amount, such as to the limit of its downward movement, and this will apply additional hydraulic pressure through line 106—104 to the land 88a of valve 88 and effect a shift of control valve 88 to the left so as to disengage the torque converter lock-up clutch C and bring the torque converter unit A back into operation. From Fig. 5 it will be noted that when the vehicle speed is above the speed at which normal light throttle lock-up of the converter unit A occurs, still, there is a considerable torque multiplication ratio available for high speed accelerating use so it is possible to overrule the automatically operated speed and accelerator controlled clutch C and to kickdown to a torque multiplying drive through the converter unit A at any time up to approximately 50 miles per hour vehicle speed. At cruising speeds of 20 to 40 miles per hour a kicked down accelerating ratio of between 1.8 and 1.2 to 1 is available for high speed accelerating drive.

Reverse drive may be obtained by moving the drive selector lever 141 to the Reverse position. This positions the manually operated control valve 144 in such a position that pressure fluid from supply conduit 128 is directed into the reverse band control conduit 151 while conduit 101 is blocked off from supply conduit 128. Conduit 101 at this time is opened to the sump 26 through valve 144 to drain the pressure fluid from both the direct drive clutch D and the torque converter lock-up clutch C. Admission of pressure fluid to conduit 151 actuates the Reverse band piston 155 and applies reverse braking band 53 so that the planetary gearing 51 will transmit a reverse drive from input shaft 8 and turbine driven shaft 16 through planetary gearing 51 to output shaft 71. Planetary gearing 51 is effective to produce a reverse drive for application of brake band 53 anchors the planet pinion carrier 52 while driving sun gear 56 rotates the annulus gear 57 in a reverse direction. Annulus gear 57 is directly connected to output shaft 71 thus a reverse drive is transmittable through the torque converter unit A to the driven or output shaft 71.

The particular torque multiplying ratios desired can be varied to meet the specific requirements of the power unit by modifying the converter design and the shift points of the control system.

This invention is concerned primarily with the use of the higher torque multiplying ratios of a torque converter unit for ordinary starting accelerating drive with an automatic lock-up of the torque converter occurring while there is still a major portion of the converter torque multiplying ratio available for a subsequent kickdown to a, high speed, accelerating drive. The transmission unit herein disclosed is of a simplified design yet one that provides all speed ratios necessary for satisfactory motor vehicle operation. Furthermore, all ordinary drive through the transmission is completely automatic and the various speed ratios are under complete control of the driver's accelerator pedal at all times. Furthermore no let up of the accelerator pedal is required to accomplish the shifts between the various ratios. This transmission unit is characterized by simplicity and flexibility which have been combined in a novel manner to provide an efficient, highly satisfactory power transmitting unit particularly adapted for motor vehicle drive.

I claim:
1. In a transmission drivingly connected to an accelerator controlled engine, coaxially arranged driving, intermediate and driven shafts, a hydrodynamic torque multiplying unit designed to have a relatively high torque range multiplying ratio of at least 3 to 1 with a gradual decrease from said high range torque multiplying ratio to a lower range torque multiplyying ratio with increase in driven shaft speed, said torque multiplying unit being connected between said driving and intermediate shafts, said torque multiplying unit comprising an impeller member drivingly mounted on said driving shaft and a turbine member drivingly mounted on said intermediate shaft, a clutch mechanism for the torque multiplying unit comprising engageable means drivingly mounted on said impeller and turbine respectively and adapted to be engaged to directly connect said impeller and turbine members, automatically controlled means to maintain said torque multiplying unit clutch mechanism temporarily disengaged on starting drive through the transmission so as to initiate all drive through the torque multiplying unit while said unit is transmitting torque in the upper portion of its torque multiplication ratios between substantially 3 to 1 and 1.5 to 1, said automatically controlled means comprising a differential pressure operated valve mechanism actuated by opposed driven shaft speed responsive pressure fluid, and pressure fluid responsive to the amount of accelerator depression, said automatically controlled means normally effecting engagement of the clutch mechanism for the torque multiplying unit prior to the time the torque multiplying unit begins to transmit torque in the lower portion of its torque multiplication ratios between substantially 1.5 to 1 and 1 to 1 to provide a positively connected direct drive for cruising speeds, and normally effecting disengagement of the clutch mechanism when driven shaft speed conditions are such that clutch disengagement will cause the torque multiplying unit to operate in its aforementioned upper torque multiplying ratios of between 1.5 and 3 to 1, driver operated means to overrule said last-mentioned automatically controlled means and to effect disengagement of the clutch mechanism for the torque multiplying unit prior to the time the automatically controlled means associated therewith would effect disengagement of the said clutch mechanism, said driver operated means providing a means for obtaining high speed transmission of torque by the torque multiplying unit in the aforementioned lower portions of the torque multiplying ratios of between 1.5 and 1 to 1 for high speed acceleration.

2. In a transmission, coaxially arranged driving, intermediate and driven shafts, a hydrodynamic torque converter designed to have a relatively high torque range multiplying ratio of approximately 3 to 1 with a gradual decrease from said high range torque multiplying ratio to a lower range torque multiplying ratio with increase in driven shaft speed, said torque multiplying unit being connected between said driving and intermediate shafts, said torque converted comprising an impeller member drivingly mounted on said driving shaft and a turbine member drivingly mounted on said intermediate shaft, a clutch mechanism for the torque converter comprising engageable means drivingly carried by said impeller and turbine and adapted to be engaged to directly drivingly connect said impeller and turbine members, a direct drive clutch adapted to be engaged to directly drivingly connect said intermediate and driven shafts, automatically controlled means comprising a governor responsive to the speed of said driven shaft, said automatically controlled means being adapted to effect disengagement of said torque converter clutch mechanism during starting drive through the transmission unit so as to initiate all drive through the torque converter while said converter is transmitting torque at torque multiplication ratios of approximately 3 to 1.5 to 1, said automatically controlled means normally effecting engagement of the clutch mechanism for the torque converter prior to the time the converter begins to transmit torque at torque multiplication ratios of less than 1.5 to 1 and effecting disengagement of the clutch mechanism when driven shaft speed conditions are such that clutch disengagement will cause the torque multiplying unit to operate in its aforementioned higher torque multiplying ratios of between 1.5 and 3 to 1, engagement of said converter clutch mechanism providing a positively connected direct drive, driver operated means to overrule said automatically controlled means to effect disengagement of the clutch mechanism for the torque converter prior to the time the automatically controlled means would effect disengagement of the said clutch mechanism, said driver operated means providing a means for obtaining high speed transmission of torque by the torque converter at relatively low torque multiplication drive of approximately 1.5 to 1 or less for high speed acceleration, and manually operated means to control engagement of said direct clutch.

3. An accelerator pedal controlled engine driven power transmission unit comprising an engine driven input shaft, a coaxially arranged intermediate shaft and a coaxially arranged output shaft, a hydrodynamic torque converter interconnecting said input and intermediate shafts, said torque converter having a torque multiplying ratio of approximately 3 to 1 or greater, and including relatively rotatable impeller and turbine elements with an automatically operated converter clutch associated therewith and arranged to be engaged to drivingly interconnect said impeller and turbine elements for the transmission of a positive drive therebetween, a direct drive clutch adapted to be engaged to drivingly interconnect said intermediate and output shafts, a pressure fluid system of substantially constant pressure output connected to said converter clutch to effect operation thereof, an output shaft speed responsive governor associated with said constant pressure fluid system and arranged so as to provide a source of output shaft speed responsive pressure fluid, an accelerator pedal controlled valve associated with said constant pressure fluid system and arranged so as to provide a source of pressure fluid responsive to the degree of accelerator depression, a differential pressure operated valve connected to said constant pressure fluid system so as to automatically control engagement and disengagement of said converter clutch, said differential pressure operated valve having the output shaft speed responsive pressure fluid, and the accelerator movement responsive pressure fluid applied thereto in opposed relationship so that said pressure fluids conjointly control operation of said valve, said converter, converter clutch and the automatic controls therefor being so arranged that said converter clutch will be disengaged on the initiation of drive whereby said convertor will initially provide torque multiplication of 3 to 1 or greater, with the control means arranged so that said converter clutch will automatically engage when the converter torque multiplication has dropped to approximately 1.5 to 1 and will automatically disengage when the driven shaft speed is reduced to a relatively low speed where the torque converter activation will provide a torque multiplication of greater than 1.5 to 1, said accelerator pedal providing a driver operable means to overrule said automatically operable controls and disengage the converter clutch to provide means for the activation of the torque converter in a speed range that will provide torque multiplication ratios of 1.5 to 1 or less for high speed accelerating drive.

References Cited in the file of this patent

UNITED STATES PATENTS

| | | |
|---|---|---|
| 1,029,610 | Harrington | June 8, 1912 |
| 2,102,634 | Lysholm | Dec. 21, 1937 |
| 2,105,625 | Wichtendahl | Nov. 8, 1938 |
| 2,120,896 | Koeppen | June 14, 1938 |
| 2,144,074 | Maybach | Jan. 17, 1939 |
| 2,260,015 | Fichtner | Oct. 21, 1941 |
| 2,309,051 | Dodge | Jan. 19, 1943 |
| 2,322,479 | Schjolin | June 22, 1943 |
| 2,324,693 | Griswold | July 20, 1943 |
| 2,332,593 | Nutt et al. | Oct. 26, 1943 |
| 2,360,646 | Carnagua | Oct. 17, 1944 |
| 2,368,684 | Simpson | Feb. 6, 1945 |
| 2,373,122 | La Brie | Apr. 10, 1945 |
| 2,374,303 | Osborne | Apr. 24, 1945 |
| 2,397,634 | Voytech | Apr. 2, 1946 |
| 2,403,954 | Schjolin | July 16, 1946 |
| 2,454,614 | Peterson | Nov. 23, 1948 |
| 2,456,328 | Schneider | Dec. 14, 1948 |
| 2,461,218 | Lapsley | Feb. 8, 1949 |
| 2,466,206 | Carnagua | Apr. 5, 1949 |
| 2,480,933 | Jandasek | Sept. 6, 1949 |
| 2,516,208 | Hasbany | July 25, 1950 |
| 2,568,007 | Jandasek | Sept. 18, 1951 |
| 2,613,503 | Syrovy | Oct. 19, 1952 |
| 2,633,035 | Livermore | Mar. 31, 1953 |
| 2,645,137 | Roche | July 14, 1953 |
| 2,689,029 | McFarland | Sept. 14, 1954 |